US009196166B2

(12) United States Patent
Horne et al.

(10) Patent No.: US 9,196,166 B2
(45) Date of Patent: Nov. 24, 2015

(54) RUNWAY TAKEOFF MONITOR (71) Applicant: Gulfstream Aerospace Corporation, Savannah, GA (US)

(72) Inventors: Thomas Horne, Savannah, GA (US); Thomas Landers, Savannah, GA (US); John Mayo, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/199,646

(22) Filed: Mar. 6, 2014

(65) Prior Publication Data

US 2014/0375478 A1    Dec. 25, 2014

Related U.S. Application Data (60) Provisional application No. 61/773,660, filed on Mar. 6, 2013.

(51) Int. Cl.
*G08B 21/00* (2006.01)
*G08G 5/00* (2006.01)
*G01C 23/00* (2006.01)
*G08G 5/06* (2006.01)

(52) U.S. Cl.
CPC ............ *G08G 5/0065* (2013.01); *G01C 23/005* (2013.01); *G08G 5/0021* (2013.01); *G08G 5/065* (2013.01)

(58) Field of Classification Search
CPC .................................................. G05D 1/0083
USPC ........................................................ 340/959
See application file for complete search history.

(56) References Cited

U.S. PATENT DOCUMENTS

| 5,103,224 | A  | * | 4/1992  | Arad ............................. 340/959 |
| 5,353,022 | A  |   | 10/1994 | Middleton et al. |
| 6,107,943 | A  |   | 8/2000  | Schroeder |
| 6,175,315 | B1 | * | 1/2001  | Millard et al. ................ 340/959 |
| 6,707,394 | B2 |   | 3/2004  | Ishihara et al. |
| 6,978,205 | B2 |   | 12/2005 | Ryan et al. |
| 7,885,734 | B2 |   | 2/2011  | Lemoult et al. |
| 7,916,042 | B2 |   | 3/2011  | Constans |
| 8,126,600 | B2 |   | 2/2012  | Conner et al. |
| 8,193,948 | B1 |   | 6/2012  | Shapiro et al. |
| 8,209,072 | B2 |   | 6/2012  | Villaume et al. |
| 8,380,372 | B2 |   | 2/2013  | Michal et al. |
| 2008/0012729 | A1 | | 1/2008  | Constans |

OTHER PUBLICATIONS

United States International Searching Authority, International Search Report and Written Opinion for International Application No. PCT/US2014/021326, mailed Aug. 8, 2014.

Learmount, D., "Farnborough: Smart safety avionics in the A350," entire document. Jul. 13, 2010 [retrieved on Jun. 13, 2014] Retrieved from the Internet: <URL: http://www.flightglobal.com/news/articles/farnborough-smart-safety-avionics-in-the-a350-343773  /> entire document.

* cited by examiner

*Primary Examiner* — Brent Swarthout
(74) *Attorney, Agent, or Firm* — Ingrassia, Fisher & Lorenz PC (57) ABSTRACT Disclosed is a runway alerting method and system for an aircraft during a take-off maneuver. The method includes determining stopping positions for the aircraft along the runway using aircraft energy state, deceleration and braking information and displaying the stopping positions on a display.

17 Claims, 6 Drawing Sheets

RUNWAY TAKEOFF MONITOR

RELATED APPLICATION

This application claims the benefit of U.S. Provisional Application No. 61/773,660 filed Mar. 6, 2013.

TECHNICAL FIELD

The technical field generally relates to aircraft, and more particularly relates to methods and apparatus for advising a pilot of an aircraft of the predicted stopping point of the aircraft in the event the pilot needed to abort the takeoff.

BACKGROUND

When performing a takeoff maneuver in an aircraft, it is sometimes necessary to abort the takeoff and stop the aircraft on the remaining available runway. Engine failure, system failure, or contaminated runway effects are some causes for a pilot to abort a takeoff attempt. Typically, during takeoff, the aircraft rapidly accelerates down the runway to a speed known as "V1", which is a decision speed where the pilot assesses whether to abort the takeoff or attempt to reach the "V2" speed where the aircraft is capable of taking off even if only one engine is operational.

Pilots are trained to monitor conditions during takeoff and abort if necessary. However, the takeoff/abort decision is left to the discretion of the pilot. Accordingly, pilots with varying levels of experience and training may respond differently to the same situation, and some pilot responses may not be the optimal choice.

Accordingly, it is desirable to assist a pilot during the takeoff phase of flight. It is further desirable that the assistance be as objective as possible and not dependent upon pilot skill or judgment. Other desirable features and characteristics will become apparent from the subsequent summary and detailed description and the appended claims, taken in conjunction with the accompanying drawings and the foregoing technical field and background.

SUMMARY

In one embodiment, a runway takeoff alerting method is provided in the event of an aborted takeoff. The method includes determining stopping positions for the aircraft along the runway using aircraft energy, deceleration and braking information and displaying the stopping positions on a display.

In another embodiments, a system is provided that includes, but is not limited to an aircraft system that includes a first apparatus that is configured to determine an aircraft speed relative to the ground and a second apparatus that is configured to determine a position along a runway when the aircraft begins deceleration. A flight system coupled to the first apparatus and the second apparatus and configured to determine a minimum stopping position for the aircraft along the runway using the aircraft speed and the predicted position along a runway when the aircraft begins deceleration. Also, a corporate stopping position is determined for the aircraft along the runway using the aircraft speed and the predicted position along a runway when the aircraft begins deceleration. These stopping positions are displayed to aid the pilot in making decisions.

DESCRIPTION OF THE DRAWINGS

Embodiments of the present invention will hereinafter be described in conjunction with the following drawing figures, where like numerals denote like elements, and.

DETAILED DESCRIPTION

As used herein, the word "exemplary" means "serving as an example, instance, or illustration." The following detailed description is merely exemplary in nature and is not intended to limit application and uses. Any embodiment described herein as "exemplary" is not necessarily to be construed as preferred or advantageous over other embodiments. All of the embodiments described in this Detailed Description are exemplary embodiments provided to enable persons skilled in the art to make or use the embodiment and not to limit the scope that is defined by the claims. Furthermore, there is no intention to be bound by any expressed or implied theory presented in the preceding technical field, background, summary or the following detailed description.

Figure 1:
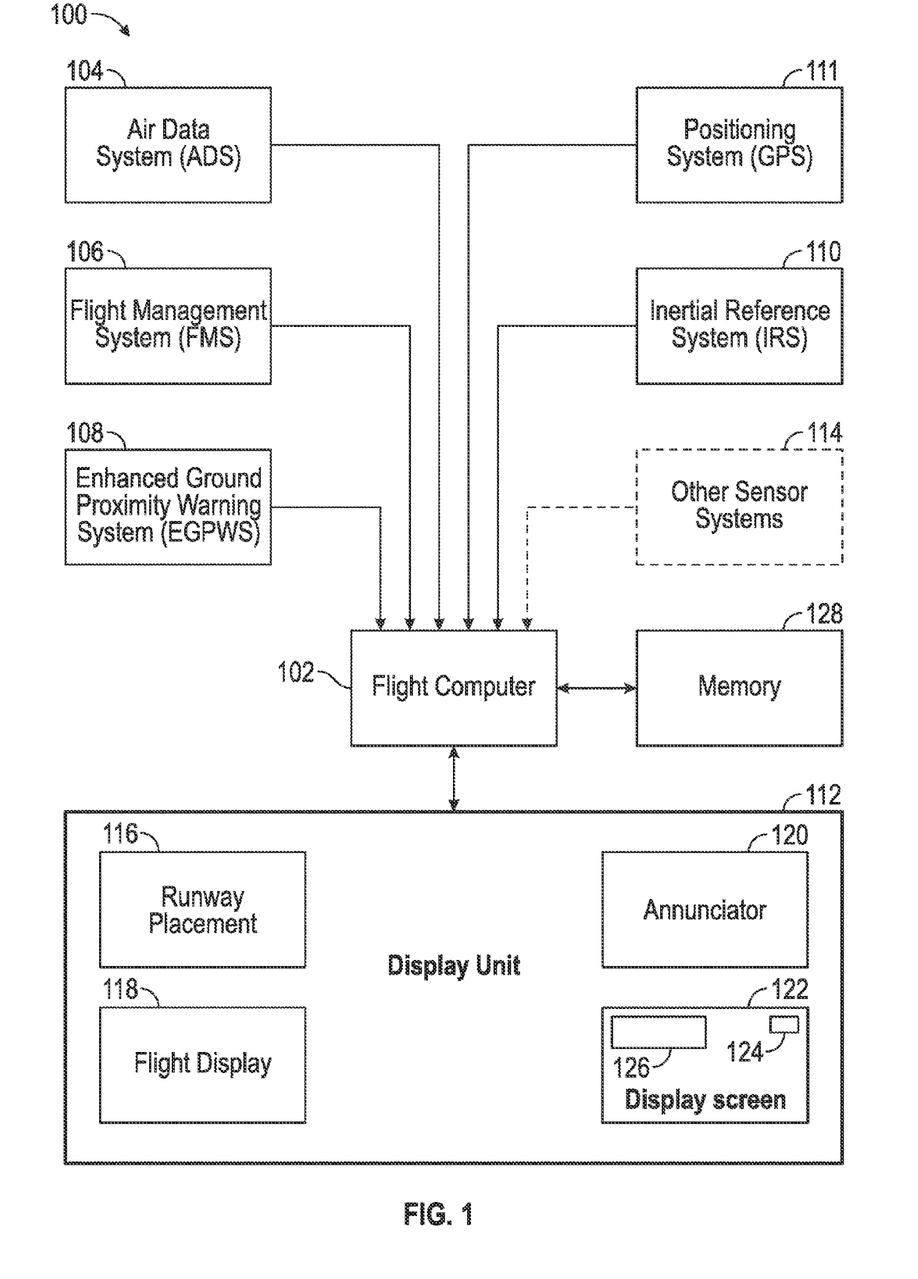
FIG. 1 is a block diagram of various aircraft flight systems in accordance with an embodiment.

FIG. 1 is block diagram of various flight systems 100 for an aircraft that implements a runway overrun monitor system and/or is capable of executing a runway overrun monitor method in accordance with exemplary embodiments. The various flight systems 100 includes a flight computer 102, an Air Data System (ADS) 104, a Flight Management System (FMS) 106, an Enhanced Ground Proximity Warning System (EGPWS) 108, an Inertial Reference System (IRS) 110, a Positioning System 111 (e.g., GPS, GLONASS or Galileo) and a display unit 112. Optionally, other proprietary or commercial sensor systems 114 provide additional input signals to the flight computer 102, such as, for example, a weight-on-wheels (WOW) sensor.

The FMS 106 is configured to provide to the flight computer 102 data regarding the flight including a landing approach plan, while the EGPWS 108 provides the flight computer 102 with a geometric altitude, where the geometric altitude is based on a three-dimensional model of terrain. The ADS 104, the FMS 106, the EGPWS 108, and the IRS 110 are disposable within the flight computer 102 or within other avionics shown in FIG. 1 or at other locations in an aircraft.

The display unit 112 displays information regarding the status of the aircraft. The display unit 112 receives input from various systems to provide information to the pilot. For example, the EGPWS 108 generates information for a runway placement display 116 to the pilot regarding the geometric altitude position of the aircraft with respect to the runway. The display unit 112 typically also includes, but is not limited to an annunciator 120 to provide verbal warnings, alert or warning tones or other audible information. The display screens 122 of the display unit 112 include icons 124 that are illuminated to indicate the occurrence of certain conditions and a text message screen 126 to display text information.

In accordance with one embodiment, the various flight systems 100 illustrated in FIG. 1 is implemented with software and/or hardware modules in a variety of configurations. For example, flight computer 102 comprises one or more processors, software module or hardware modules. The processor(s) reside in single integrated circuits, such as a single or multi-core microprocessor, or any number of integrated circuit devices and/or circuit boards working in cooperation to accomplish the functions of the flight computer 102. The flight computer 102 is operable coupled to a memory system 128, which may contain the software instructions or data for the flight computer 102, or may be used by the flight computer 102 to store information for transmission, further processing or later retrieval. In accordance with one embodiment, the memory system 128 is a single type of memory component, or composed of many different types of memory components. The memory system 128 can include non-volatile memory (e.g., Read Only Memory (ROM), flash memory, etc.), volatile memory (e.g., Dynamic Random Access Memory (DRAM)), or some combination of the two. In an embodiment, the runway overrun monitor system is implemented in the flight computer 102 via a software program stored in the memory system 128.

Although not illustrated in FIG. 1, it will be appreciated that each of the various flight systems 100 typically includes one or more sensors. In general, a sensor is a device that measures a physical quantity and converts the measurement into a signal received by a system or the flight computer 102. In general, sensors are used to sense any number of physical quantities, such as light, motion, temperature, magnetic fields, gravitational forces, humidity, vibration, pressure, electrical fields, current, voltage, sound, and other physical aspects of the aircraft or a surrounding environment. Non-limiting examples of sensors include, but is not limited to weight-on-wheel sensors, vibration sensors, air speed sensors, altimeter, gyroscope, inertial reference unit, magnetic compass, navigation instrument sensors, throttle position sensor, pitch, roll and yaw sensors, etc.

According to exemplary embodiments, a runway takeoff monitor is provided that computes or predicts stopping points on the runway to provide the pilot with guidance on where the aircraft could stop if a takeoff was aborted. A first stopping point is the minimum stopping distance computed using a maximum deceleration value that the aircraft is capable of achieving. A second stopping point (sometimes referred to as a "corporate stop") is computed using a reduced deceleration capability that might be expected when only using alternative deceleration devices, such as thrust reversers or a reduced braking capability consistent with the design of the aircraft. Some embodiments include additional stopping points as selected by the pilot, based upon integration with an aircraft autobrake system. Thus, the deceleration capabilities of the aircraft are known, and may be determined during flight testing or validation of the aircraft. In some embodiments, the aircraft deceleration information, inertial three-dimensional (horizontal and vertical) velocities, inertial three-dimensional position, runway start and end points, runway heading, runway glideslope angle, runway slope, and weight-on-wheels sensors are used by the runway overrun monitor.

Figure 2A:
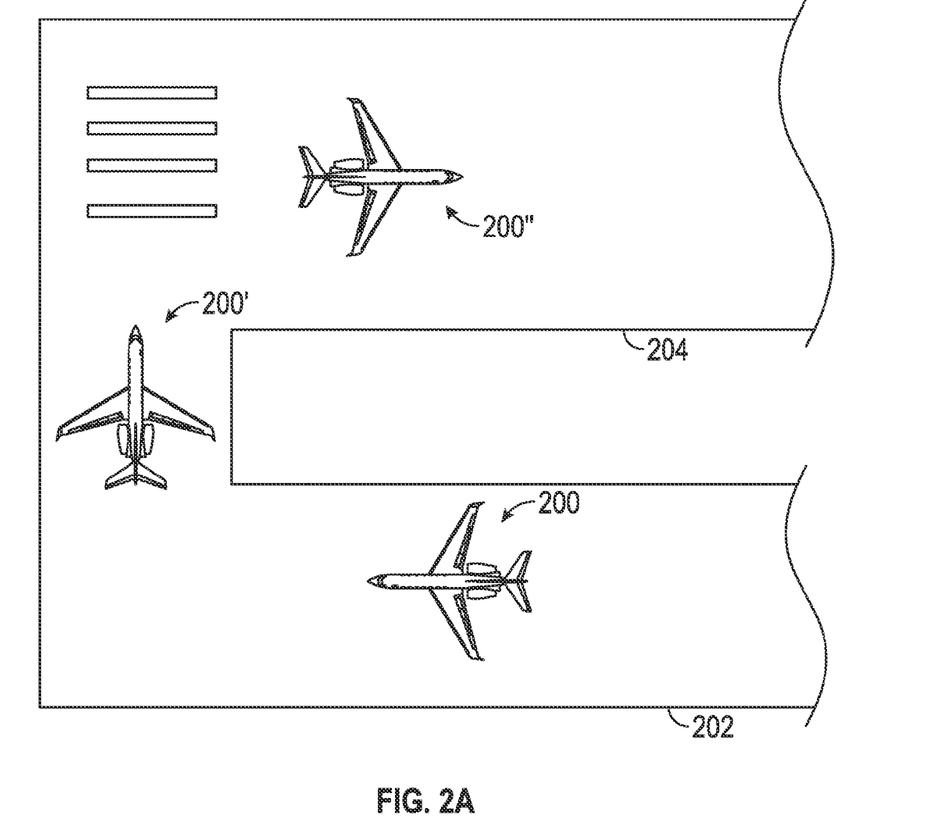
FIGS. 2A and 2B illustrates an aircraft preparing to takeoff in accordance an embodiment.

FIG. 2A illustrates an aircraft 200 on a taxiway 202 preparing to takeoff. As the aircraft 200' leaves the taxiway 202 heading for the runway 204, the aircraft 200" will pause at the beginning of the runway 204 awaiting clearance from local Air Traffic Control (ATC) to begin the takeoff maneuver. At some point on or prior to moving onto the taxiway 202 the takeoff runway monitor system will be activated. In some embodiments, the runway takeoff monitor system is manually activated by the pilot or co-pilot. Preferably, in manual activation embodiments, activation by the pilot or co-pilot is part of a takeoff Standard Operation Procedure (SOP) provided by the flight department to the flight crew. In some embodiments, activation of the runway takeoff monitor system is automatic, such as by the flight computer 102 as shown in FIG. 1, at some point on the taxiway 202 or the runway 204. The aircraft position information may be known to the flight computer such as via a Global Positioning System (GPS) onboard the aircraft.

Once activated, the runway takeoff monitor system is monitoring one or more operational parameters of the aircraft to compute the minimum and corporate stopping positions on the runway. As the aircraft 200" accelerates down the runway 204, the takeoff runway monitor is computing (predicting) where the aircraft will come to a stop should the pilot abort the takeoff maneuver and provides this information to the pilot as will be discussed in more detail below.

Figure 2B:
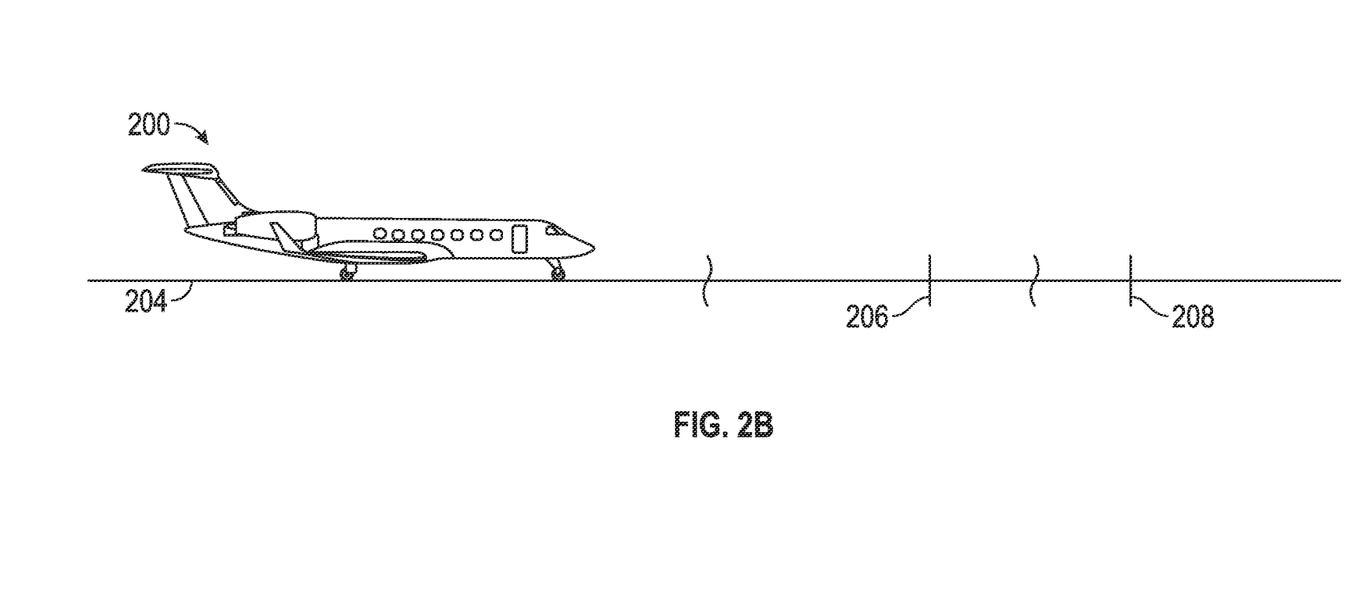

FIG. 2B illustrates a side view of the aircraft 200" on the runway 204. In the illustrated example, point 206 is where the aircraft would reach the "V1" speed and the pilot would make a decision to continue with takeoff or to abort the takeoff. A pilot may make this decision due to an engine failure, a system failure, or contaminated runway effects. As the pilot evaluates conditions to make this determination, the pilot is provided with a graphical indication of where it is predicted that the aircraft could stop on the runway using a maximum stopping effort (to have the minimum stopping distance) and a reduced effort that may not involve using thrust reversers for full braking (sometimes called a corporate stop). Moreover, should a pilot initially determine to continue with the takeoff attempt, and a failure should occur between "V1" and "V2", the pilot is provided with some guidance as to where the aircraft will stop as opposed to attempting to reach the "V2" speed 208.

Figure 3A:
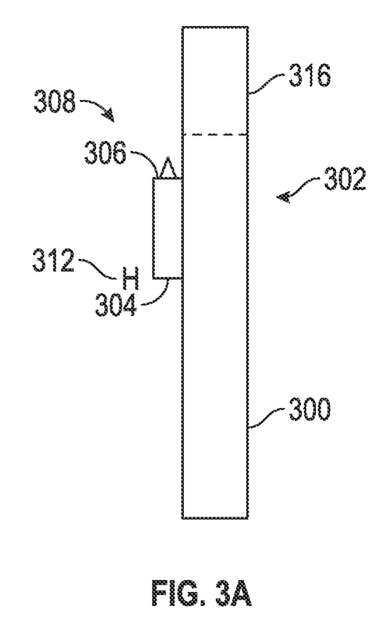
FIGS. 3A-C, 4A-B and 5 are illustrations of a graphical indication provided by an embodiment.
Figure 3B:
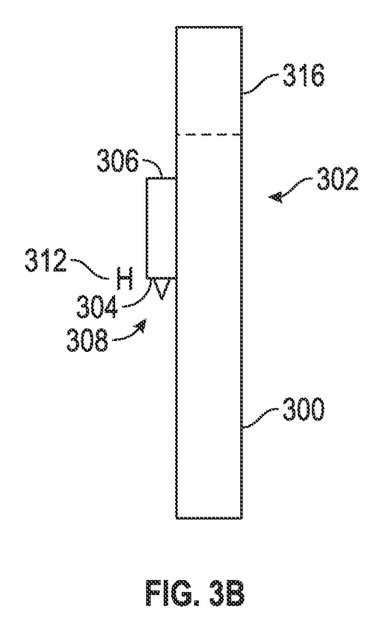
Figure 3C:
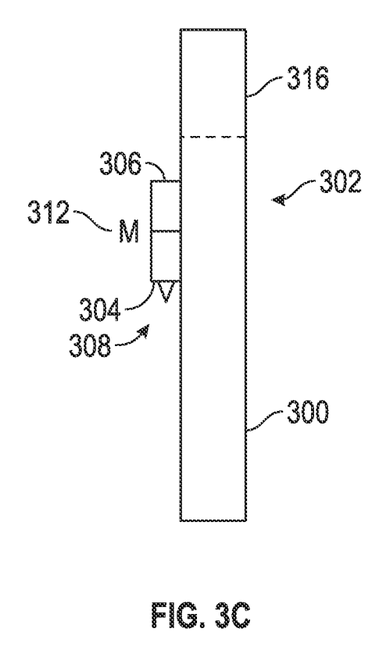

FIGS. 3A-C are illustrations of exemplary graphical indications that may be provided to the pilot such as on the display screen 122 of FIG. 1. As can be seen, a runway depiction 300 is provided. An overlay 302 indicates both the computed (or predicted) minimum stopping point 304 and the corporate stopping point 306. Accordingly, to exemplary embodiments, the minimum stopping point and the corporate stopping point are computed (predicted) using equation (1);

$$\text{Stopping point} = Brk_{on}Pt + \frac{V^2}{2 \times |A|}$$

Where:

$Brk_{on}Pt$ is the position on the runway (distance from runway start) where the breaks would be applied if the takeoff were aborted (typically estimated at one second from abort);

V is the velocity of the aircraft as determined by aircraft speed sensors; and

A is the absolute value of the acceleration (deceleration being a negative value) using either the maximum deceleration or the corporate deceleration depending on which predicted stopping point is being computed.

If the aircraft aborts takeoff, the velocity term (V) will be rapidly decreasing, thus shortening the predicted stopping distance. To provide an indication of this information to the pilot, trend arrows 308 provide an indication as to whether these predicted stopping points are trending further down the runway or treading toward the aircraft being able to stop within the remaining runway distance. Thus, shortly after takeoff abort and application of the brakes, the trend arrows 308 may be pointed down the runway depiction 300 as shown in FIG. 3A. However, in FIG. 3B and FIG. 3C, the aircraft has slowed enough for the trend arrows 308 to reverse to indicate a safe stop should be achieved.

If the aircraft is equipped with an autobrake system, then a label indicating the brake setting is depicted in autobrake label 312. An aircraft autobrake system allows the pilot to select braking deceleration characteristics ranging from low (L) to medium (M) to high (H). The minimum stopping point 304 corresponds to the high (H) autobrake setting. FIG. 3C shows a depiction of a medium (M) braking deceleration selected by the pilot. A similar embodiment would be presented for a low (L) or other autobrake setting. The pilot would anticipate that a runway excursion could occur if either the minimum stopping point 304 or the autobrake setting stopping point 312 were to exceed the end of the runway.

Also, a runway buffer 316 (horizontal dashed line) is depicted in FIGS. 3A-C, and is nominally the one-thousand foot remaining marker. However, in some embodiments, this buffer line can be pilot selectable as a desired runway stopping point. This capability allows the pilot to pre-select a stopping point that may correspond to desired taxi way exit point from the runway, or provide a safety margin. The pilot can then monitor the display and adjust aircraft approach and landing performance to meet the desired runway stopping point.

Figure 4A:
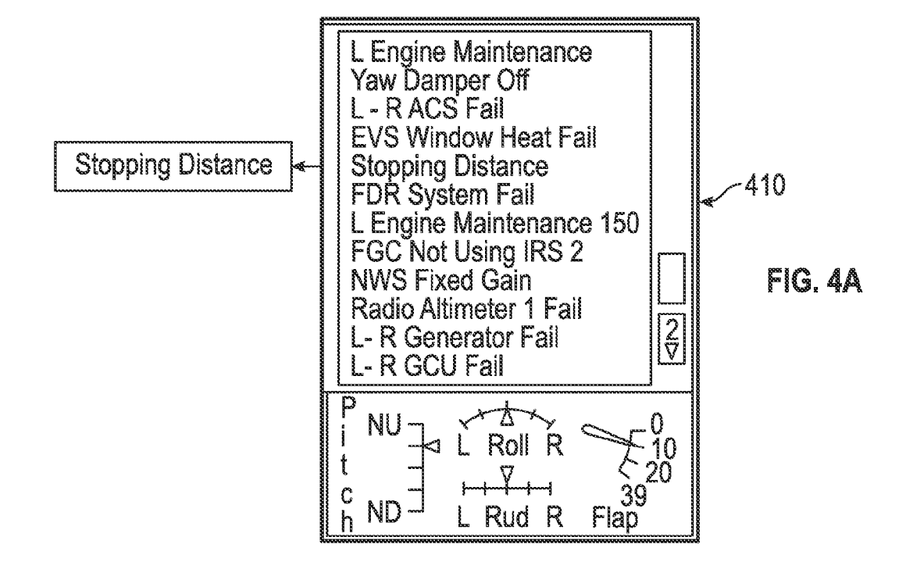
Figure 4B:
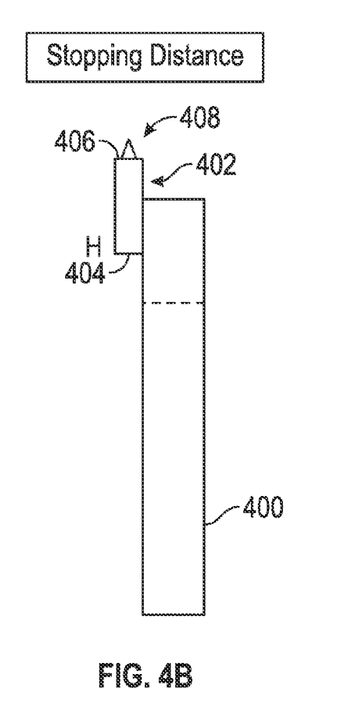

However, in some circumstances, the aircraft may have too high an energy causing the potential for a runway overrun if the takeoff is aborted. Thus, in FIGS. 4A-B, the overlay 402 indicates the predicted corporate stopping point 406 exceeds the available runway. However, the minimum stopping point 404 is still shown on the runway indicating that the pilot should apply the maximum braking/stopping systems available to avoid the potential of overrunning the runway. In this circumstance the color of the runway depiction 400 may change to amber or some other color indicative a warning.

Figure 5:
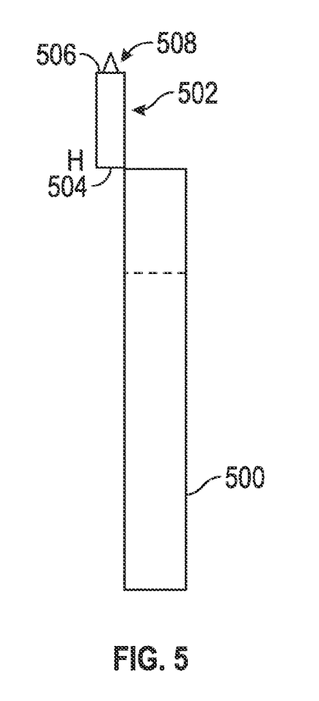

In FIG. 5, a more serious scenario is illustrated where the runway takeoff monitor predicts that both the corporate stopping point 506 and the minimum stopping point 504 will exceed the available remaining runway. In this circumstance, the runway depiction 500 may change to a red color. This indicates to the pilot that it is predicted that the aircraft cannot stop on the remaining available runway.

Figure 6:
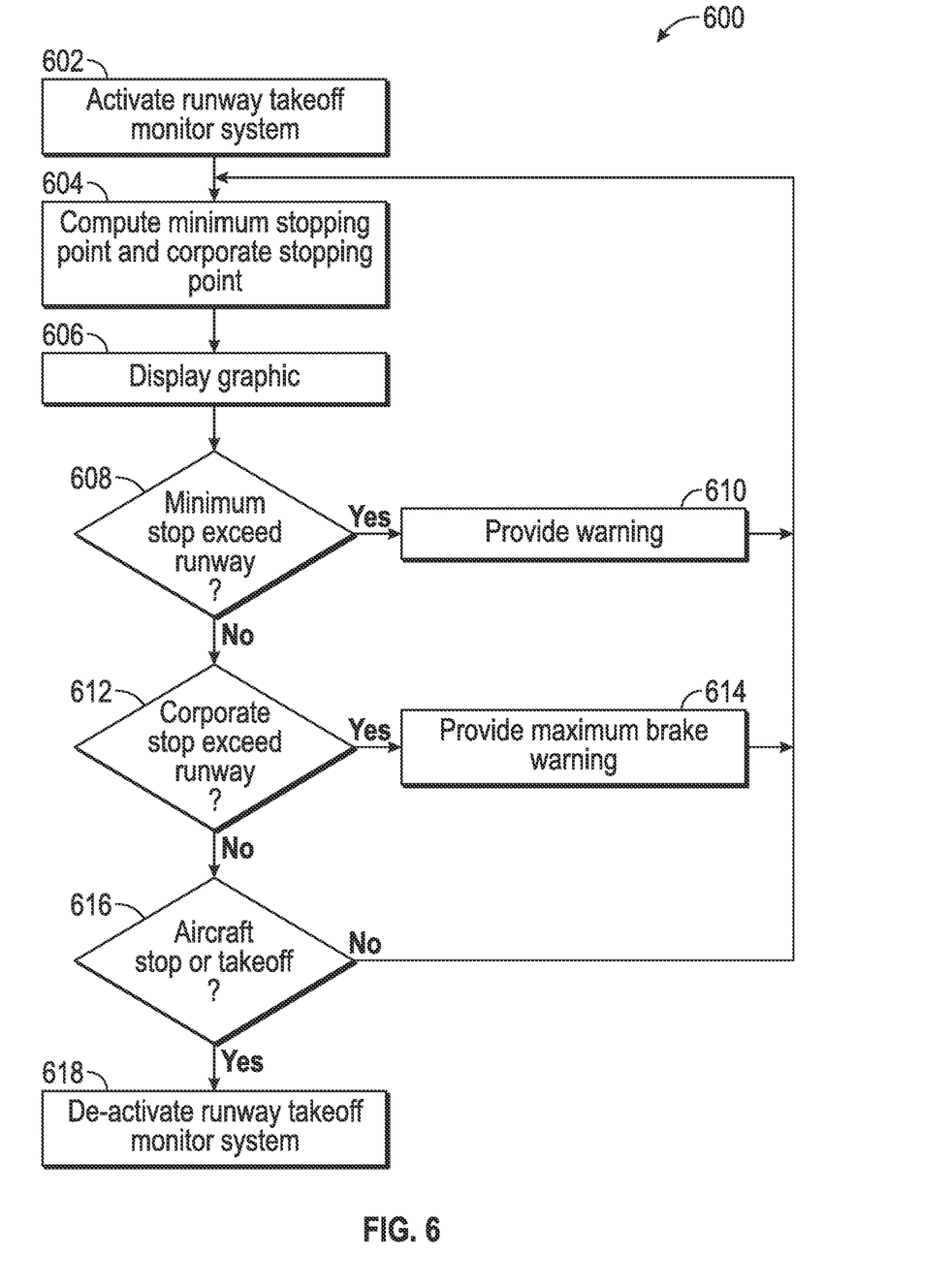
FIG. 6 is a flowchart of a method in accordance with an embodiment.

FIG. 6 is a flowchart of a method 600 performed by the runway takeoff monitor system in accordance with an embodiment. In one embodiment, the various tasks performed in connection with the method 600 of FIG. 6 are performed by software executed in a processing unit, hardware, firmware, or any combination thereof. For illustrative purposes, the following description of the method 600 of FIG. 6 refers to elements mentioned above in connection with FIG. 1 to FIG. 5.

In an embodiment, portions of the method of FIG. 6 performed by different elements of the described system. However, in accordance with another embodiment, portions of the method of FIG. 6 are performed by a single element of the described system.

It should also be appreciated that the method of FIG. 6 may include no additional or alternative tasks or may include any number of additional or alternative tasks, and that the method of FIG. 6 may be incorporated into a more comprehensive procedure or process having additional functionality not described in detail herein or implemented as a stand-alone procedure. Moreover, one or more of the tasks shown in FIG. 6 are removable from an embodiment of the method 600 of FIG. 6 as long as the intended overall functionality remains intact.

The routine begins in step 602 with an activation of the runway takeoff monitor system. In some embodiments, the runway takeoff monitor system is manually activated by the pilot or co-pilot or automatically activated by movement toward the runway. After activation of the runway takeoff monitor system, step 604 computes the minimum stopping point and the corporate stopping point of the aircraft as discussed above in connection with equation (1). Step 606 displays one of the graphic indications as discussed above in connection with FIGS. 3-5. Next, decision 608 determines whether the aircraft has a predicted minimum stopping point that will exceed the runway. If so, then a warning is give in step 610 and the routine continues to compute or predict the aircraft stopping points until the aircraft is stopped or the aircraft achieves takeoff. If not, then decision 612 determines whether the corporate stopping point will exceed the remaining available runway. If so, step 614 provides a warning message for landing distance, so that the pilot will understand to apply the maximum available stopping systems to avoid the potential for overrunning the runway should the takeoff be aborted.

If both the minimum stopping point and the corporate stopping point are predicted not to exceed the runway (FIGS. 3A and 3B), decision 616 determines whether the aircraft has come to a stop or achieved takeoff. If so, the runway takeoff monitor system deactivates in step 618 and the routine ends.

The disclosed methods and systems provide a runway takeoff monitor system for an aircraft that enhances safe air travel by augmenting pilot judgment with an objective determination of whether an aircraft is can safely stop on a runway.

It will be appreciated that the various illustrative logical blocks/tasks/steps, modules, circuits, and method steps described in connection with the embodiments disclosed herein may be implemented as electronic hardware, computer software, or combinations of both. Some of the embodiments and implementations are described above in terms of functional and/or logical block components or modules and various processing steps. However, it should be appreciated that such block components or modules may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope as set forth in the claims.

For example, an embodiment of a system or a component may employ various integrated circuit components, for example, memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word exemplary is used exclusively herein to mean serving as an example, instance, or illustration. Any embodiment described herein as "exemplary" is not necessarily to be construed as preferred or advantageous over other embodiments.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as first, second, third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as connect or coupled to that are used in describing a relationship between different elements does not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments.

What is claimed is:

1. A runway alerting method for an aircraft attempting a take-off maneuver, comprising:
    determining, in a processor, stopping positions for the aircraft along the runway using aircraft energy, deceleration and braking information, the stopping positions including at least a minimum stopping position and a corporate stopping position, wherein the minimum stopping position and the corporate stopping position are determined using the equation:

$$\text{Stopping point} = Brk_{on}Pt + \frac{V^2}{2 \times |A|}$$

Where:
$Brk_{on}Pt$ is the position on the runway (distance from runway start) where the brakes are predicted to be applied;

V is the predicted velocity of the aircraft at the brakes-on location as determined by aircraft speed sensors and assumed speed loss that would occur before the brakes are applied; and

|A| is the absolute value of the acceleration (deceleration being a negative value) using the appropriate deceleration depending on which predicted stopping point is being computed; and displaying, by the processor, the stopping positions on a display.

2. The method of claim 1, further comprising activating a runway take-off monitor system for the aircraft as the aircraft approaches the runway.

3. The method of claim 1, wherein the displaying of the stopping positions on the display comprises displaying an illustration of the runway and displaying an overlay to indicate the stopping positions relative to a runway end point.

4. The method of claim 3, further comprising displaying a trending indication to indicate whether the stopping positions are trending further down the runway or trending toward the beginning of the runway.

5. The landing method of claim 3, further comprising providing a runway distance caution message when a maximum stopping position exceeds the remaining runway distance and a corporate stopping position remains within the remaining runway distance.

6. The method of claim 3, further comprising providing a runway distance caution message when a minimum stopping position exceeds the remaining runway distance less an operator selected buffer distance, and a minimum stopping position remains within the remaining runway distance.

7. The landing method of claim 3, further comprising providing a runway distance warning when both the corporate stopping position and the minimum stopping position exceed the remaining runway distance.

8. The landing method of claim 1, further comprising the processor annunciating verbal warnings or audible signals regarding stopping capability.

9. An aircraft, comprising:
    a first apparatus that is configured to determine an aircraft speed relative to the ground;
    a second apparatus that is configured to determine a position along a runway when the aircraft begins deceleration;
    a flight system coupled to the first apparatus and the second apparatus that is configured to, the flight system configured to:
    activate a runway take-off monitor system for the aircraft as the aircraft approaches the runway;
    determine a minimum stopping position for the aircraft along the runway using the aircraft speed and the predicted position along a runway when the aircraft begins deceleration;
    determine a corporate stopping position for the aircraft along the runway using the aircraft speed and the predicted position along a runway when the aircraft begins deceleration; and
    display the minimum stopping position and the corporate stopping position on a display;
    wherein the minimum stopping position and the corporate stopping position are determined using the equation:

$$\text{Stopping point} = Brk_{on}Pt + \frac{V^2}{2 \times |A|}$$

Where:

Brk$_{on}$ Pt is the position on the runway (distance from runway start) where the brakes are predicted to be applied;

V is the predicted velocity of the aircraft at the brakes-on location as determined by aircraft speed sensors and assumed speed loss that would occur before the brakes are applied; and

|A| is the absolute value of the acceleration (deceleration being a negative value) using the appropriate deceleration depending on which predicted stopping point is being computed.

10. The aircraft of claim 9, wherein the flight system displays the minimum stopping position and the corporate stopping position on the display by displaying an illustration of the runway and displaying an overlay to indicate the minimum stopping position and the corporate stopping position relative to a remaining runway distance.

11. The aircraft of claim 9, wherein the flight system also displays a trending indication to indicate whether the current aircraft deceleration is trending further down the runway or trending to stop within the remaining runway distance.

12. The aircraft of claim 9, wherein the flight system also provides a runway distance caution message when the corporate stopping position exceeds the remaining runway distance and the maximum stopping position remains within the remaining runway distance.

13. The aircraft of claim 9, wherein the flight system also provides a landing distance warning when both the corporate stopping position and the maximum stopping position exceed the remaining runway distance.

14. A non-transitory computer readable medium embodying a computer program product, said computer program product comprising:

an aircraft take-off monitor program, the aircraft take-off monitor program configured to:

activate a runway take-off monitor system for the aircraft as the aircraft approaches a runway;

determine a minimum stopping position for the aircraft along the runway;

determine a corporate stopping position for the aircraft along the runway; and display the minimum stopping position and the corporate stopping position on a display;

wherein the minimum stopping position and the corporate stopping position are determined using the equation:

$$\text{Stopping point} = Brk_{on}Pt + \frac{V^2}{2 \times |A|}$$

Where:

Brk$_{on}$Pt is the position on the runway (distance from runway start) where the brakes are predicted to be applied;

V is the predicted velocity of the aircraft at the brakes-on location as determined by aircraft speed sensors and assumed speed loss that would occur before the brakes are applied; and

|A| is the absolute value of the acceleration (deceleration being a negative value) using the appropriate deceleration depending on which predicted stopping point is being computed.

15. The non-transitory computer readable medium embodying the computer program product according to claim 14, the aircraft take-off monitor program further configured to display an illustration of the runway and displaying an overlay to indicate the minimum stopping position and the corporate stopping position relative to a remaining runway distance.

16. The non-transitory computer readable medium embodying the computer program product according to claim 14, the aircraft take-off monitor program further configured to display a trending indication to indicate whether the current aircraft deceleration is trending further down the runway or trending to stop within the remaining runway distance.

17. The non-transitory computer readable medium embodying the computer program product according to claim 14, the aircraft take-off monitor program further configured to provide a runway distance warning message when the corporate stopping position exceeds the remaining runway distance and the maximum stopping position remains within the remaining runway distance.

\* \* \* \* \*